(12) United States Patent
Dane (10) Patent No.: US 10,703,444 B2
(45) Date of Patent: Jul. 7, 2020

(54) UNMANNED MARINE SAILING VESSEL (71) Applicant: SOLAR SAILOR PTY LTD, Middle Cove, New South Wales (AU)

(72) Inventor: Robert Dane, Middle Cove (AU)

(73) Assignee: SOLAR SAILOR PTY LTD, New South Wales (AU)

( * ) Notice: Subject to any disclaimer, the term of this patent is extended or adjusted under 35 U.S.C. 154(b) by 17 days.

(21) Appl. No.: 16/308,165

(22) PCT Filed: Jun. 6, 2017

(86) PCT No.: PCT/AU2017/050553
§ 371 (c)(1),
(2) Date: Dec. 7, 2018

(87) PCT Pub. No.: WO2017/210727
PCT Pub. Date: Dec. 14, 2017

(65) Prior Publication Data
US 2019/0300124 A1    Oct. 3, 2019

(30) Foreign Application Priority Data
Jun. 8, 2016  (AU) ................. 2016902228

(51) Int. Cl.
*B63B 49/00* (2006.01)
*B63G 13/00* (2006.01)
(Continued)

(52) U.S. Cl.
CPC ............... *B63B 3/38* (2013.01); *B63B 49/00* (2013.01); *B63G 13/00* (2013.01);
(Continued)

(58) Field of Classification Search
CPC ..... B63B 3/38; B63B 49/00; B63B 2035/007; B63B 2022/006; B63B 35/04; B63B 43/06; B63G 13/00; G01V 1/3843; B63H 9/04
See application file for complete search history.

(56) References Cited

U.S. PATENT DOCUMENTS 5,228,407 A * 7/1993 Cummer ................. B63B 7/082
114/345
2007/0051292 A1* 3/2007 Kilbourn ................ B63H 9/061
114/311
(Continued)

FOREIGN PATENT DOCUMENTS

EP    2628676 B1    6/2014
EP    2796901 A2    10/2014
(Continued)

OTHER PUBLICATIONS

Notification of Transmittal of The International Search Report and The Written Opinion of the International Searching Authority, or the Declaration issued in corresponding application No. PCT/AU2017/050553 dated Oct. 27, 2017, 16 pages.

*Primary Examiner* — Anthony D Wiest
(74) *Attorney, Agent, or Firm* — Weber Rosselli & Cannon LLP (57) ABSTRACT

The present invention relates broadly to an unmanned surface vessel (10) comprising a hull (12), an underwater appendage (14), a winch (16), and a cable or rope (18). The cable or rope (18) is at its distal end attached to a remote device (20) with the cable or rope (18) arranged to cooperate with the winch (16) to be deployed and retrieved from the vessel (10) via operation of the winch (16). The underwater appendage is in the form of a keel including a cavity (22) designed to partly locate the winch (16).

15 Claims, 10 Drawing Sheets

(51) Int. Cl.
   *B63B 35/00*   (2020.01)
   *B63B 3/38*   (2006.01)
   *G01V 1/38*   (2006.01)
   *B63B 22/00*   (2006.01)

(52) U.S. Cl.
   CPC ... *B63B 2022/006* (2013.01); *B63B 2035/007* (2013.01); *G01V 1/3843* (2013.01)

(56) References Cited

U.S. PATENT DOCUMENTS

| | | |
|---|---|---|
| 2007/0203623 A1 | 8/2007 | Saunders et al. |
| 2009/0283024 A1* | 11/2009 | Robertson ................ B63B 3/38 114/140 |
| 2013/0251456 A1* | 9/2013 | Haugen .................... F16L 1/16 405/166 |
| 2014/0261126 A1 | 9/2014 | Jenkins et al. |
| 2016/0046228 A1 | 2/2016 | Williams |
| 2016/0147223 A1 | 5/2016 | Edwards et al. |

FOREIGN PATENT DOCUMENTS

| | | |
|---|---|---|
| WO | 2014129907 A1 | 8/2014 |
| WO | 2015032114 A1 | 3/2015 |

\* cited by examiner

UNMANNED MARINE SAILING VESSEL

TECHNICAL FIELD

The present invention relates broadly to a marine vessel and relates particularly to an unmanned surface vessel typically designed as a sailing vessel.

BACKGROUND OF INVENTION

Sonar systems are typically installed in defence vessels for surveillance purposes and more particularly for detecting the presence of submarines. These known sonar systems include towed array sonar deployed from surface vessels such as frigates. The towed array sonar includes a system of hydrophones towed behind the frigate or other surface vessel via a tow cable. The tow cable can be up to one or more kilometres in length and is spooled about a cable drum mounted on the deck or alongside the hull of the surface vessel from which it is deployed and retrieved.

SUMMARY OF INVENTION

According to one aspect of the present invention there is provided an unmanned surface vessel comprising:
a hull;
an underwater appendage in the form of a keel which is at least in part hollow thereby defining a cavity, the keel being attached to the hull;
a winch located at least partly within the cavity, the winch arranged to cooperate with a cable or rope to be deployed and retrieved from the vessel via operation of the winch;
the keel including at least one aperture through which the cable or rope passes, said aperture being adapted to permit the ingress of water from outside the hull into at least the cavity of the keel improving the righting moment of the unmanned surface vessel.

Preferably the winch is substantially aligned with a vertical axis of the keel and a majority of the winch is located within the cavity improving the righting moment of the vessel, the winch having an axis of rotation oriented substantially perpendicular to the keel's vertical axis.

Preferably the unmanned surface vessel also comprises a housing fixed internally of the hull and designed to contain the winch, the housing arranged to contain water substantially within the cavity of the keel. More preferably the housing is arranged to retractably receive a cassette including the winch.

Preferably the winch is designed to allow and contain spooling of the cable or rope, sufficiently constrained as to reduce the likelihood of overriding of the cable or rope within the winch. More preferably the winch includes a central hub and an opposing pair of flanges mounted either side of the hub, the flanges being separated a distance substantially equal to or slightly greater than the diameter of the cable or rope.

Preferably the cable or rope includes a remote device mounted at its distal end. More preferably the aperture is sized to permit passage of the remote device on retrieval of the cable or rope via the winch, the remote device thus being stowed within the cavity of the keel. Even more preferably the remote device includes a sensor, camera or sampler.

Preferably the unmanned surface vessel further comprises a rudder located forward of the keel thereby reducing likelihood of the cable or rope fouling the rudder on deployment of the cable or rope.

Preferably the unmanned surface vessel is a sailing vessel.

According to a second aspect of the invention there is provided an unmanned surface vessel comprising:
a hull;
an underwater appendage in the form of a keel which is at least in part hollow thereby defining a cavity, the keel being attached to the hull and adapted to permit flooding of water from outside the hull into at least the cavity of the keel;
a housing fitted internally of the hull and surrounding the cavity, the housing adapted to contain the flooded water substantially within the cavity;
a local device located at least partly within the cavity.

Preferably the keel includes an aperture which permits the ingress of water into the cavity for its flooding.

Preferably the local device is in the form of a cassette which is retractably received in the housing.

Preferably the retractable cassette is in the form of a keel.

Preferably the local device includes sonar, camera, sensor, batteries or any one or more combinations of these active or passive local devices.

It is to be understood that any reference in this specification to an unmanned surface vessel is to include an autonomous surface vessel.

BRIEF DESCRIPTION OF DRAWINGS

In order to achieve a better understanding of the nature of the present invention a preferred embodiment of an unmanned surface vessel will now be described, by way of example only, with reference to the accompanying drawings in which:

FIG. 9b is a detailed sectional view shown in perspective of the remote device partly deployed from the keel of FIG. 9a;

DETAILED DESCRIPTION

As best shown in FIGS. 1 to 5 there is an unmanned surface vessel 10 according to one embodiment of a first aspect of the invention generally comprising a hull 12, an underwater appendage 14, a winch 16, and a cable or rope 18. The cable or rope 18 is at its distal end attached to a remote device 20 with the cable or rope 18 arranged to cooperate with the winch 16 to be deployed and retrieved from the vessel 10 via operation of the winch 16.

In this embodiment the underwater appendage 14 is in the form of a keel attached to the hull 12 in a conventional manner. The keel 14 includes a cavity 22 designed to partly locate the winch 16. The keel 14 is in this example substantially hollow and thus internally defines the cavity 22. The vessel 10 also includes a rudder 19 located in its bow region. The forward rudder 19 provides effective steerage of the unmanned surface vessel 10 whilst reducing the likelihood of the cable or rope 18 fouling the rudder 19 on deployment of the cable or rope 18.

The keel 14 at its forward bottom corner includes a first aperture 24 in the form of a D-shaped opening at the base of the keel 14. The D-shaped opening 24 provides passage for the cable or rope 18 on deployment or retrieval of the remote device 20. The keel 14 at its bottom trailing edge includes a second aperture 25 for optionally deploying the remote device 20 from the rear of the keel 14. If the remote device 20 is to operate at or near the surface of the water it is preferably deployed with the cable 18 exiting the second aperture 25. If the remote device 20 is to operate at depth or near the seabed the cable 18 exits the first aperture 24.

The remote device 20 in this embodiment is shaped substantially complementary to and sits within a pocket 26 formed at the D-shaped opening of the first aperture 24 adjacent the leading bottom corner of the keel 14. The pocket 26 allows the vessel 10 to rest on the lower surface of the keel 14 without damaging the remote device 20 when transporting the vessel 10 by trailer. The pocket 26 of the first aperture 24, and the second aperture 25 both form a continuation of the cavity 22 of the keel 14 to permit ingress of water into the cavity 22. The water contained within the cavity 22 advantageously improves the righting moment of the unmanned surface vessel 10. In this embodiment the winch 16 is substantially aligned with a vertical axis of the keel 14. The majority of the winch 16 is located within the cavity 22 further improving the righting moment of the vessel 10. The winch 16 has an axis of rotation depicted roughly at 28 oriented substantially perpendicular to the keel's 14 vertical axis.

Figure 1:
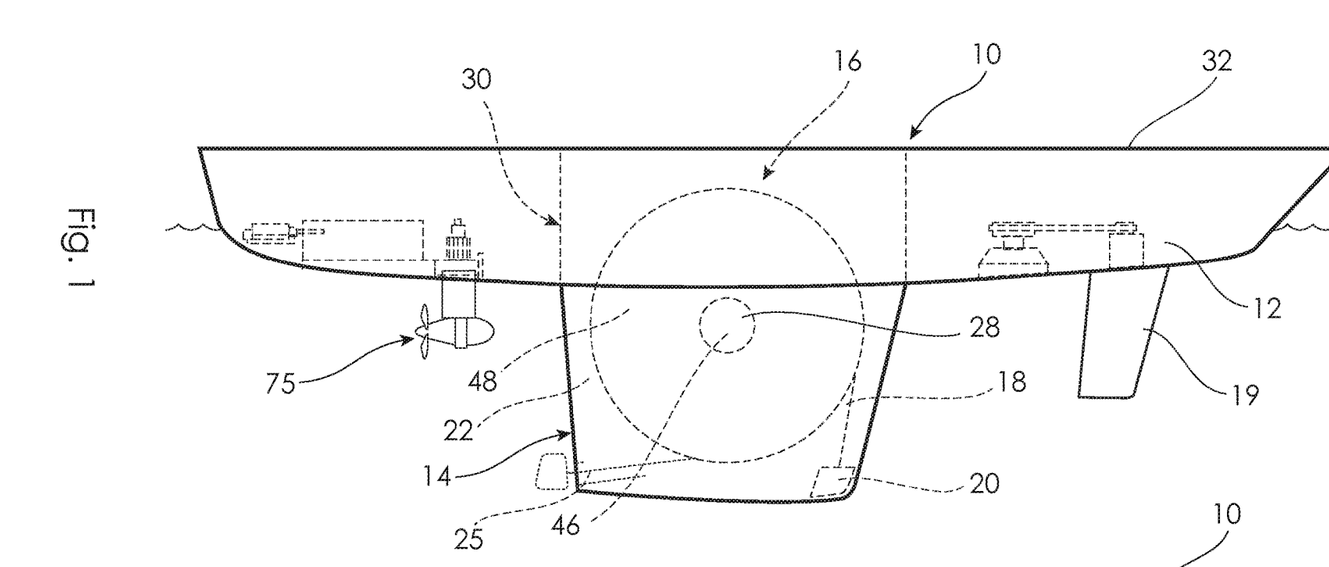
FIG. 1 is a side elevational view of an unmanned surface vessel according to one embodiment of a first aspect of the invention.
Figure 2:
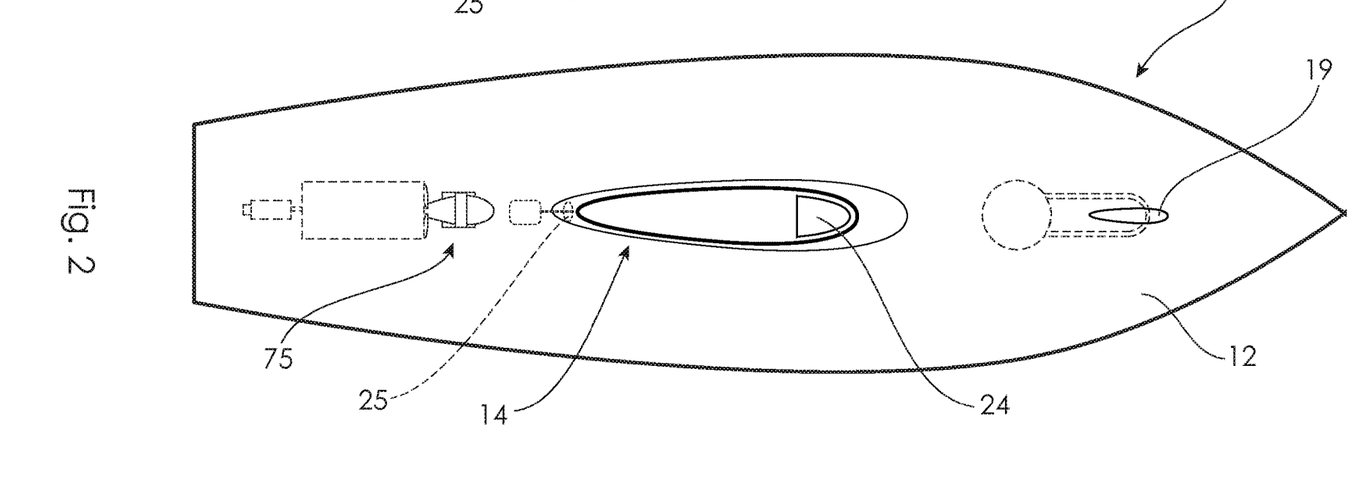
FIG. 2 is an underneath view of the unmanned surface vessel of FIG. 1.
Figure 3:
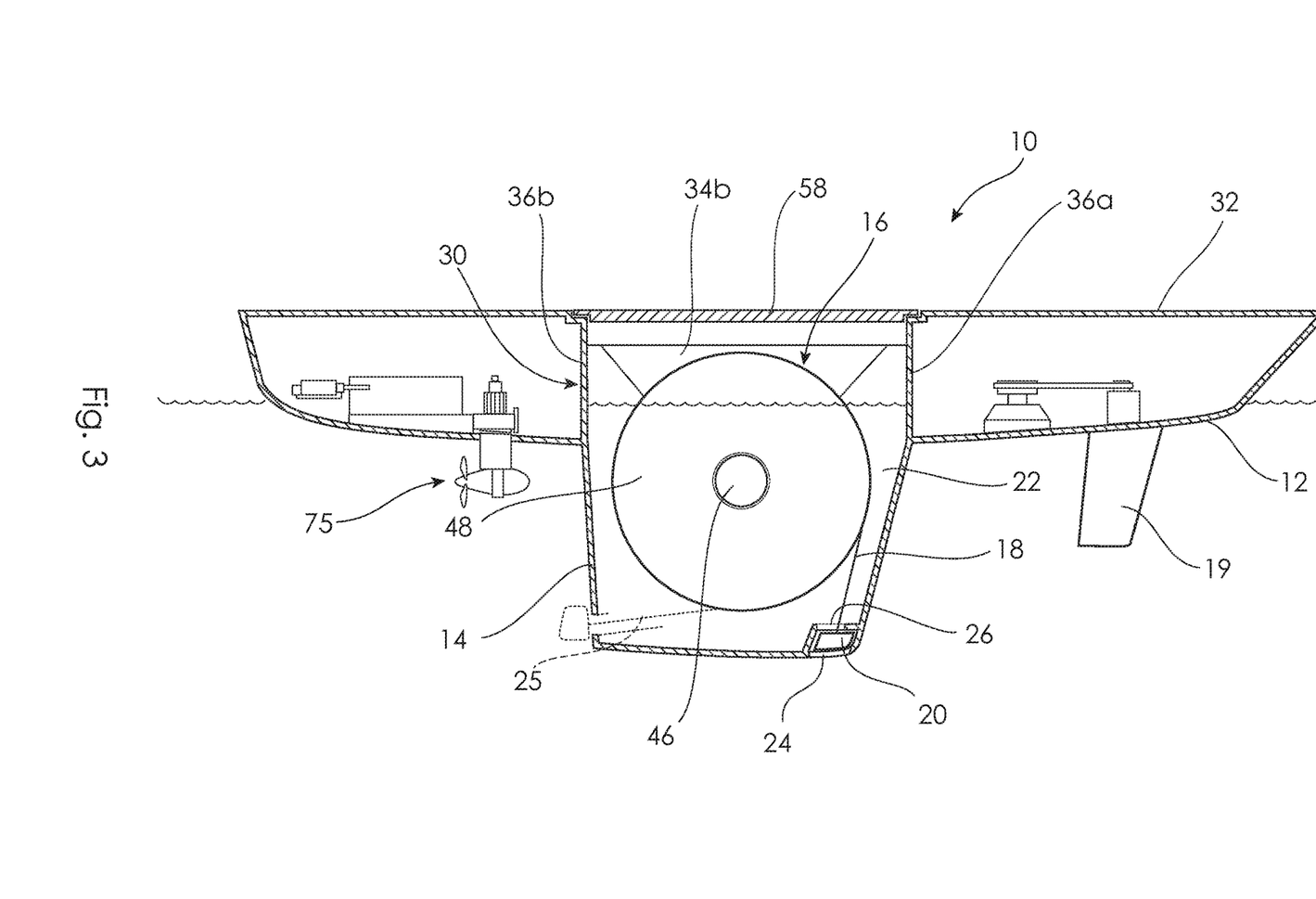
FIG. 3 is a longitudinal sectional view of the unmanned surface vessel of FIGS. 1 and 2 showing a winch and associated components in solid line detail.
Figure 4:
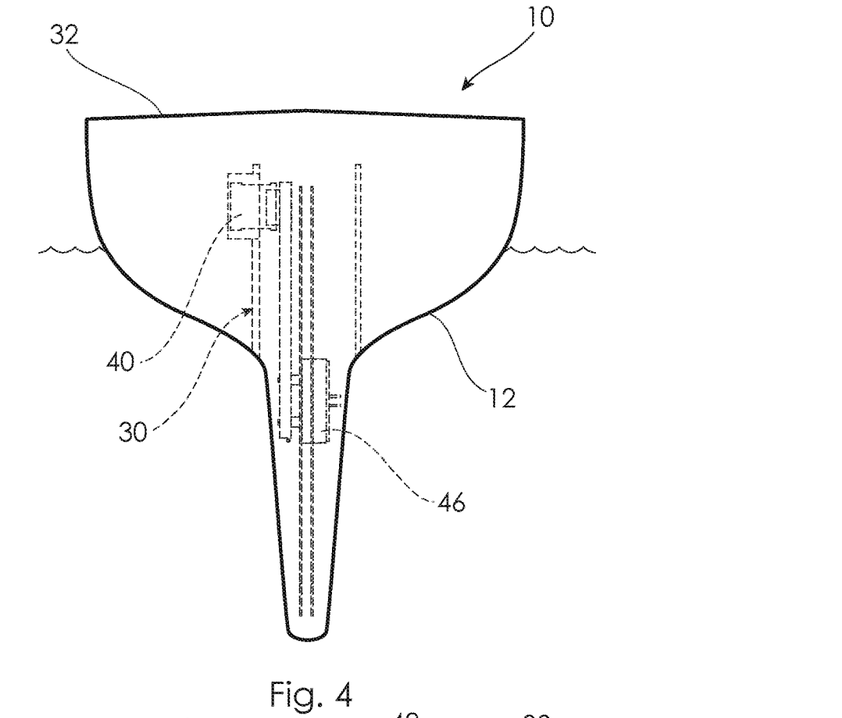
FIG. 4 is an aft view of the unmanned surface vessel of the preceding figures.
Figure 5:
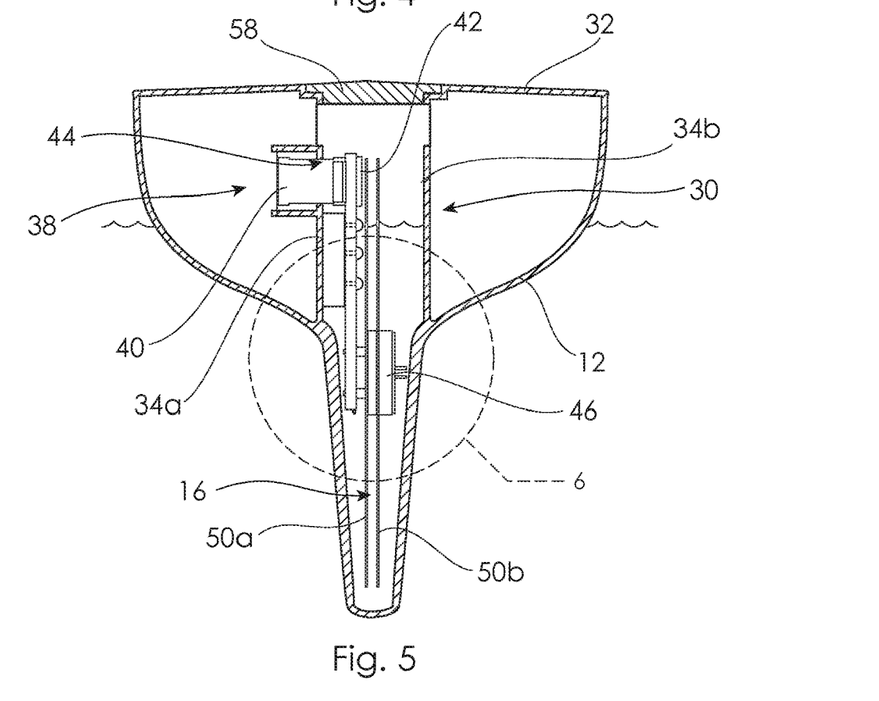
FIG. 5 is a transverse sectional view taken through the winch of the unmanned surface vessel of the preceding figures.

As best shown in FIGS. 3 and 5 the unmanned surface vessel 10 also comprises a housing designated as 30 fitted internally of the hull 12. The housing 30 of this example is formed between a lower section of the hull 12 adjacent the keel 14 and spans vertically toward a deck 32 of the unmanned surface vessel 10. The housing 30 thus includes a pair of opposing side walls 34a and 34b sealed at their forward and aft edges with respective forward and aft bulkheads 36a and 36b. The housing 30 serves two primary functions insofar as it:
1. contains water substantially within the cavity 22 of the keel 14 which may otherwise flood the bilge of the vessel 10;
2. contains the winch 16 which projects outside the cavity 22.

Figure 6:
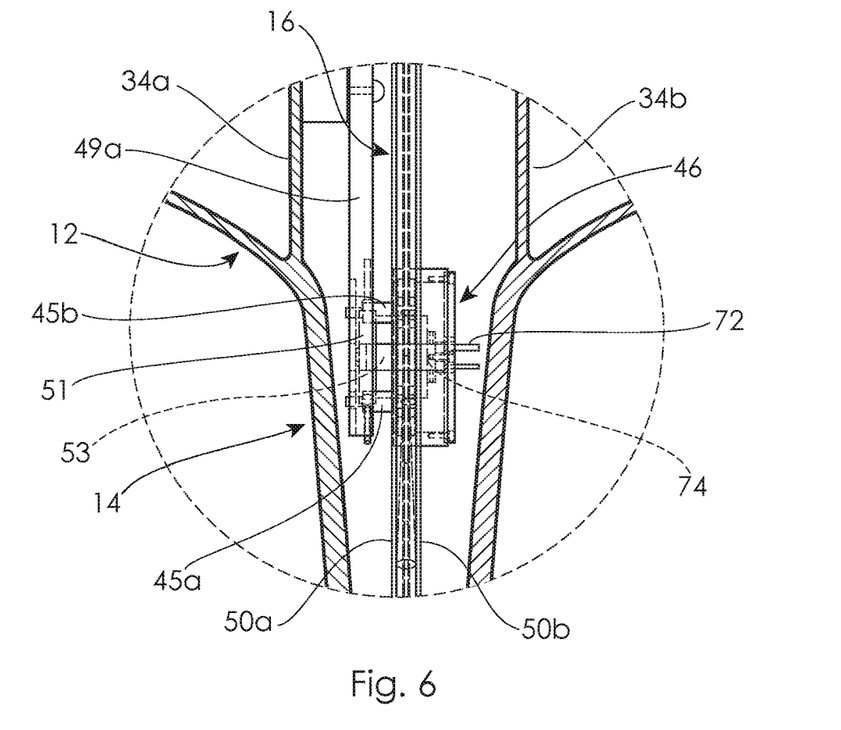
FIG. 6 is a detailed sectional view of the winch located in the cavity of the underwater appendage taken from FIG. 5.
Figure 7A:
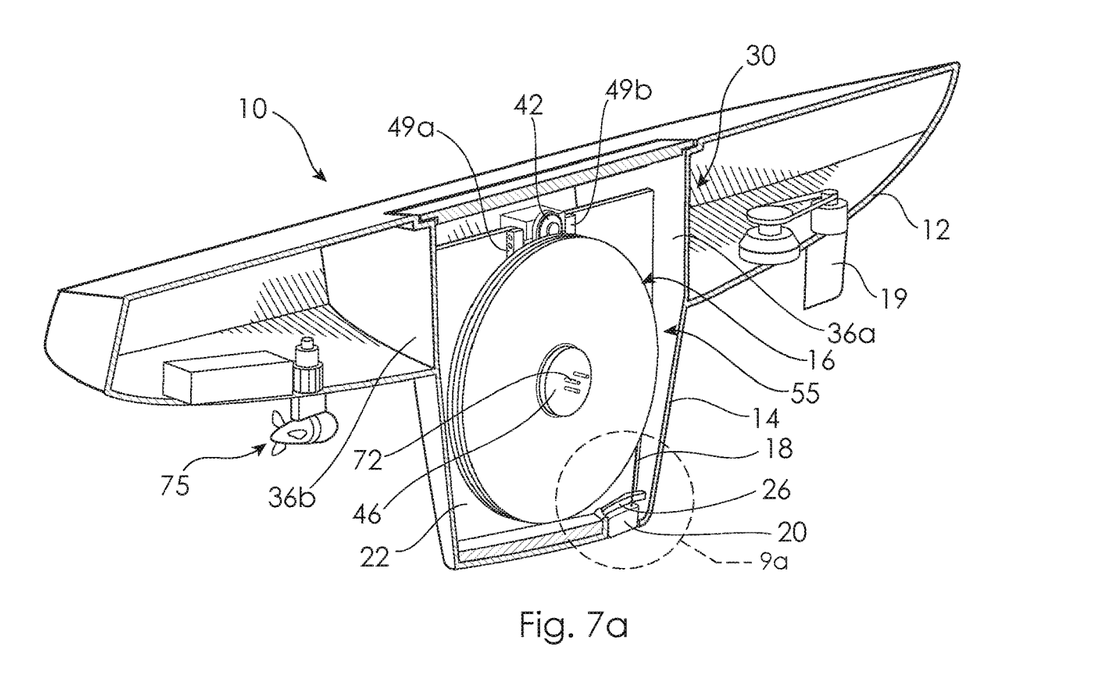
FIG. 7a is a longitudinal sectional view shown in perspective of the unmanned surface vessel of the preceding figures with the remote device located at the front of the keel.
Figure 7B:
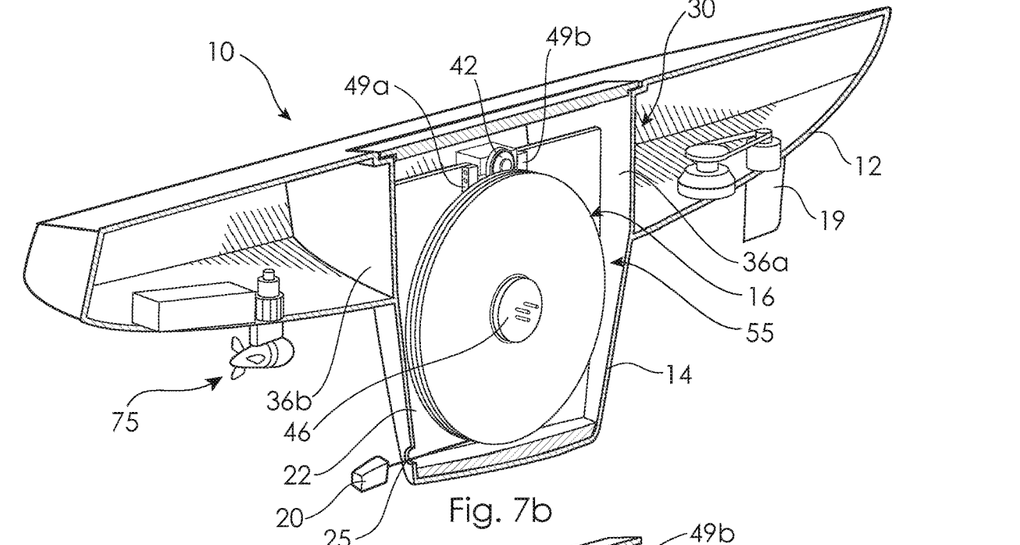
FIG. 7b is a further longitudinal sectional view shown in perspective but with the remote device located at the rear of the keel of the vessel of FIGS. 1 to 6.
Figure 10:
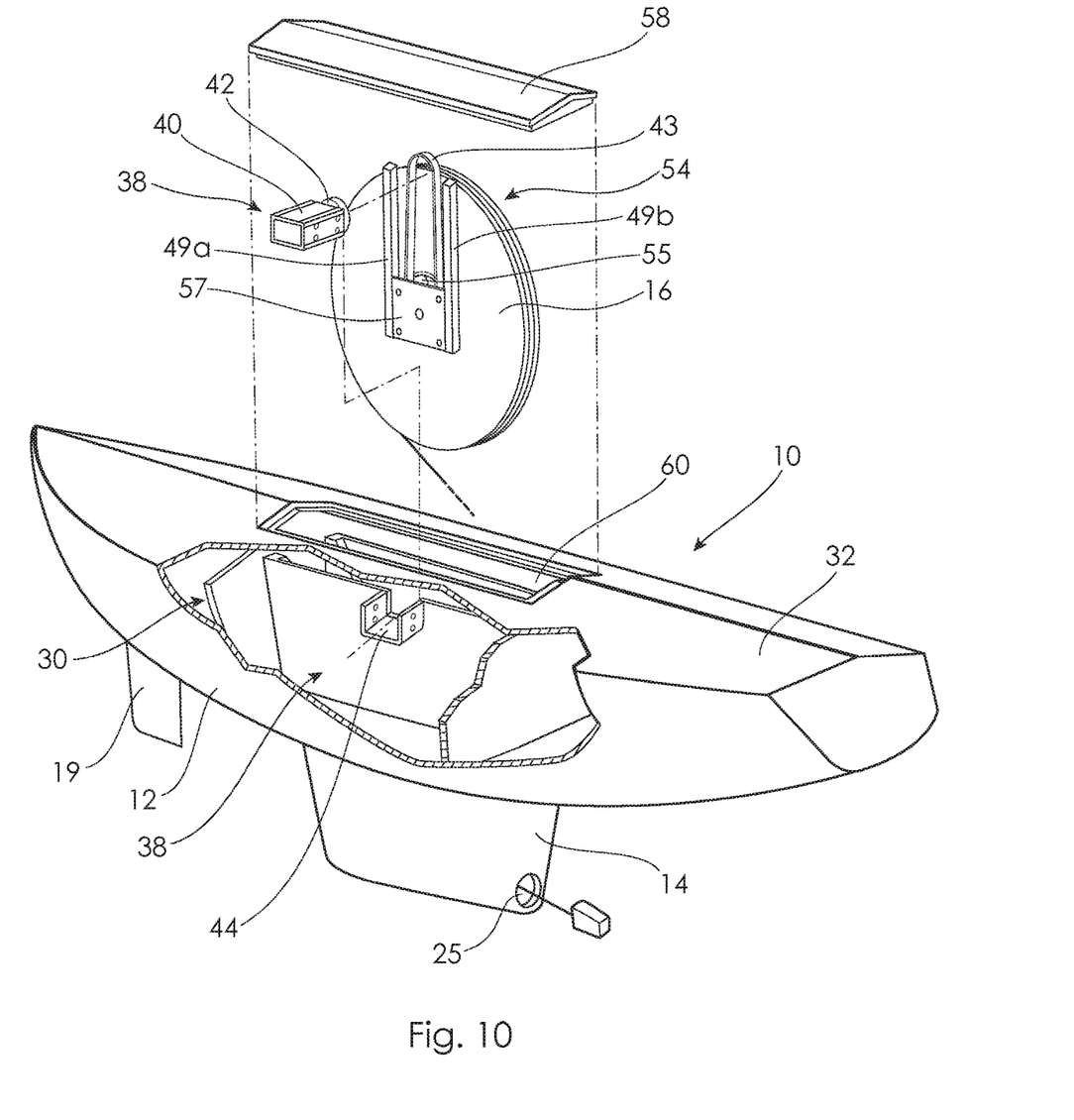
FIG. 10 is a part cutaway shown in perspective of the unmanned surface vessel of the preceding figures showing the winch and its associated cassette partly retracted from the unmanned surface vessel together with the drive mechanism for the winch also partly retracted.

As best seen in FIG. 10, the winch 16 is rotated in opposing directions via a drive assembly depicted at 38. The drive assembly 38 includes an electrically powered motor 40 and its associated drive pulley 42. As best seen in FIG. 6, the drive pulley 42 cooperates with a continuous drive belt 43 which wraps about a driven pulley 51 fixed axially to a drive shaft 53 associated with the winch 16 and arranged for its rotation. The winch 16 on one face and around its axis includes a circular annulus 55 within which a series of rollers such as 45a and 45b are located and about which the winch 16 rotates in a rolling action. The drive belt 43 is tensioned so that rotation of the drive pulley 42 rotates the driven pulley 51 and in turn the winch 16 via the drive shaft 53.

The drive assembly 38 is retractably mounted to the side wall 34a through a window 44 provided in the side wall 34a. The winch 16 as seen in FIG. 10 is supported within the cavity 22 of the keel 14 via a pair of mounting rails 49a and 49b. The mounting rails 49a/b are at an upper region fixed to the side wall 34a of the housing 30. As seen in FIG. 6, the winch 16 is supported by the mounting rails 49a/b via the rollers 45a/b which are secured to a mounting plate 57 fixed to the lower region of the rails 49a/b. The mounting plate 57 also provides mounting for a bearing assembly (not shown) associated with the driven pulley 51 and the drive shaft 53. In this embodiment the rope or cable 18 is wound or spooled onto the winch 16 for retrieval of the remote device 20 by rotation of the winch 16 in an anti-clockwise direction (viewed from the starboard side). The remote device 20 is deployed by rotation of the winch 16 in an opposite and clockwise direction via the drive assembly 38.

As best shown in FIG. 6 the winch 16 of this embodiment includes a stationary hub 46 about which the winch 16 rotates. The winch 16 is in the form of a large diameter pulley which is required because of the relatively large minimum bend diameter of the cable or rope 18. The winch of pulley 16 includes a pair of opposing flanges 50a and 50b arranged to contain spooling of the cable or rope 18 onto the winch 16. The opposing flanges 50a and 50b are separated a distance equal to or slightly greater than the diameter of the cable or rope 18 to promote spooling of the cable or rope 18 in single layers only. This spooling of the cable or rope 18 is sufficiently constrained so as to reduce the likelihood of overriding of the cable or rope 18 within the winch 16.

Figure 8:
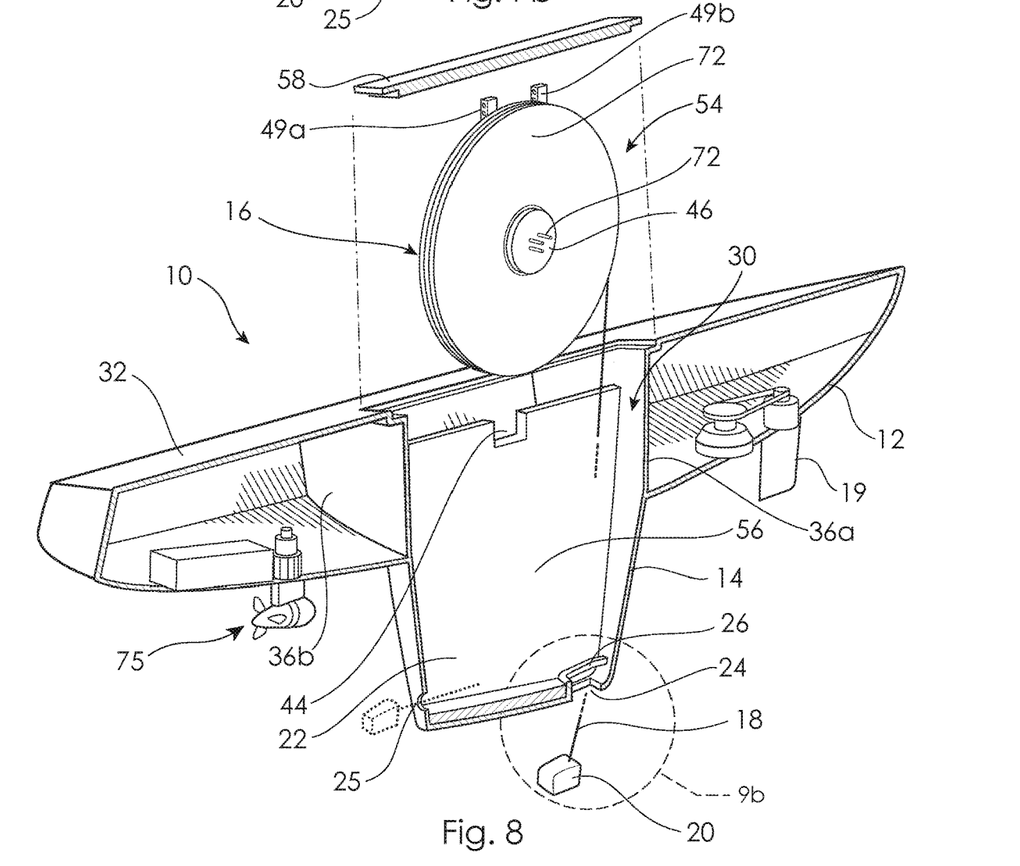
FIG. 8 is another longitudinal sectional view shown in perspective with the winch and its associated cassette retracted from the cavity of the keel and unmanned surface vessel of the figures preceding.

As shown in FIGS. 8 and 10, the winch 16 is designed to be retractably received within the housing 30. The winch 16 of this example is in the form of a cassette 54 raised or lowered into the housing 30. The unmanned surface vessel 10 includes a hatch 58 designed to seal about an opening 60 formed within the deck 32. The hatch 58 thus contains the winch 16 and its associated cassette 54 when they are located within the cavity 22.

Figure 9A:
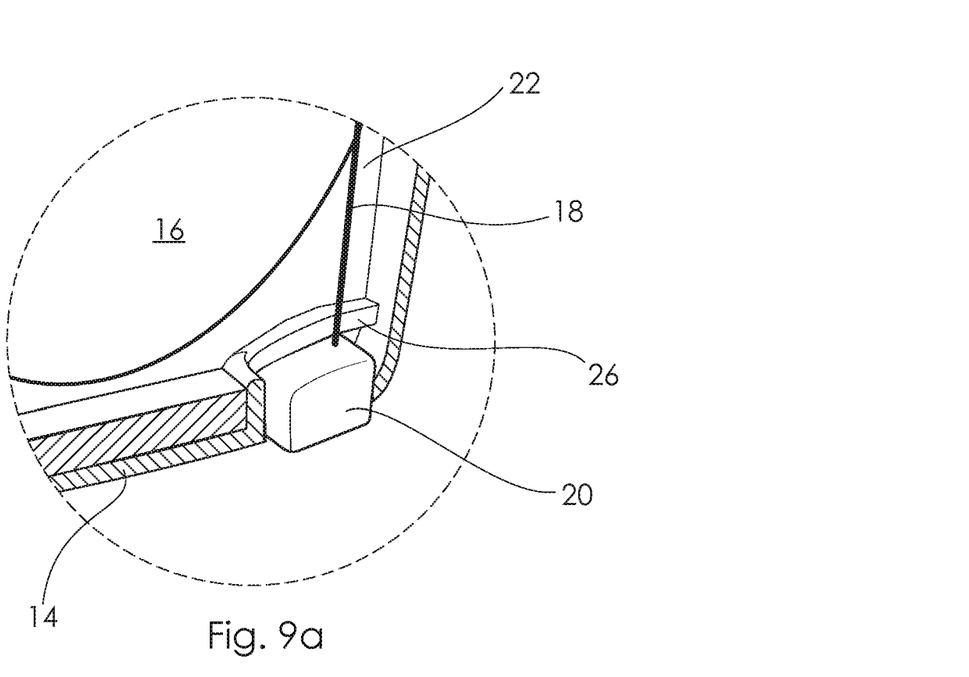
FIG. 9a is a detailed sectional view shown in perspective of the remote device attached to the distal end of the cable or rope in its retrieved position within the keel of the unmanned surface vessel of the preceding figures.
Figure 9B:
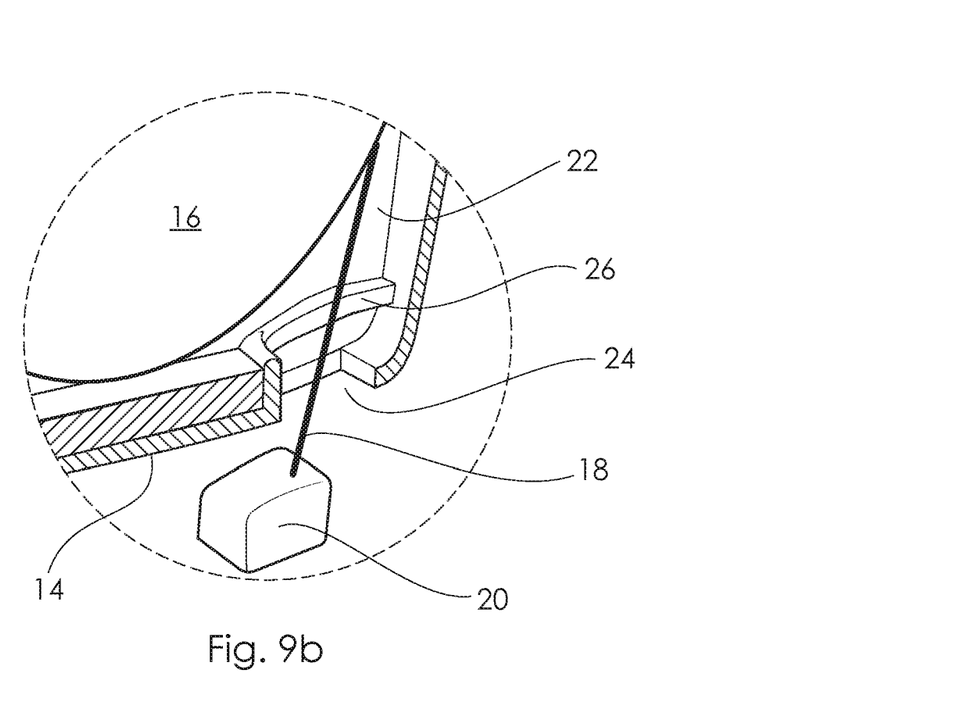

FIGS. 9a and 9b are detailed views in cross-section of the first opening 24 of the keel 14 and its associated pocket 26. The remote device 20 is shown retrieved and partly deployed in FIGS. 9a and 9b respectively. The cavity 22 of the keel 14 is flooded with water via the first opening 24. In this embodiment a small lower section of the winch 16 is shown located deep within the cavity 22. The remote device 20 of this example is a sensor such as a sonar device. The remote device 20 may however be in the form of a camera, sampling device, or other active or passive remote device connected to the distal end of the cable or rope 18.

As best shown in FIG. 6 the winch cassette 54 includes comms (not designated) arranged to communicate with the remote device 20. In this example the comms are hardwired between the remote device 20 and the winch 16. The hardwiring (not illustrated) may be associated with the rope or cable 18 or alternatively the rope or cable 18 may itself form the hardwiring, such as an ethernet cable. The comms communicates locally with the unmanned surface vessel 10 via additional hardwiring shown schematically as cables 72 extending from the hub 46. The cables 72 electronically connect with wiring or the cable 18 itself associated with the remote device 20 via slip rings such as 74 mounted within the hub 46. Although not illustrated, the comms may provide data for on-board storage at the unmanned surface vessel 10 and/or the data may be communicated wirelessly onshore via an appropriate communication network.

Figures 11, 12:
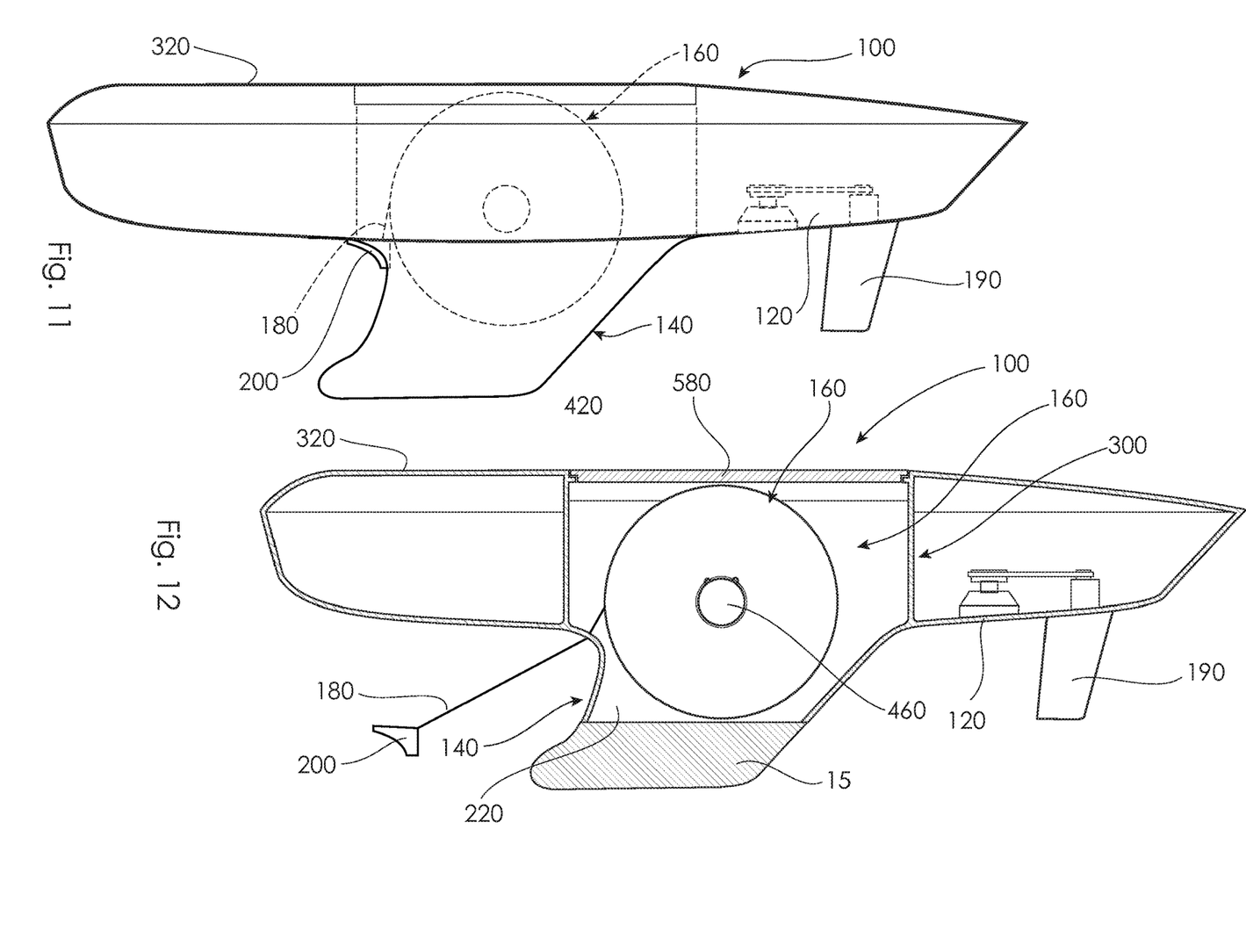
FIG. 11 is a side elevational view of an alternative embodiment of an unmanned surface vessel according to the first aspect of the present invention.
FIG. 12 is a longitudinal sectional view of the alternative unmanned surface vessel of FIG. 11 showing the remote device partly deployed.

FIGS. 11 and 12 are side elevational views of an alternative embodiment of an unmanned surface vessel 100 according to the first aspect of the invention. For ease of reference and in order to avoid repetition like components of this embodiment have been designated with an additional "0" for the same components of the previous embodiment. For example, the winch of this alternative embodiment has been designated as 160.

The alternative unmanned surface vessel 100 is in essence is the same as the unmanned surface vessel 10 of the previous embodiment with the following main exceptions:
1. the rope or cable 180 is spooled about the winch 160 in an anticlockwise direction working outwardly of the winch 160 (viewed from the starboard side);
2. the rope or cable 180 is deployed and retrieved via an opening 240 between an aft edge of the keel 140 and an adjoining section of the hull 120;
3. the winch 160 is elevated within the cavity 220 of the keel 140 whilst still being contained underneath the deck 320 of the vessel 100;
4. the keel 140 includes additional ballast 15 such as lead to improve the stability or righting moment of the vessel 100 although the cavity 220 is nonetheless flooded with water via the opening 240 in a similar manner to the preceding embodiment.

The unmanned surface vessel such as 10 may be powered by various means including sail power and/or motor power via an underwater propeller 75. In either case the sailing vessel 10 is typically an unmanned surface vessel designed to deploy the remote device such as 20 whilst sailing for the purposes of surveillance or data collection. The remote device 20 is deployed or retrieved via rotation of the winch 16 in a clockwise or anticlockwise direction depending on the design of the unmanned surface vessel and the winch 16. The unmanned surface vessel 10 is provided with on-board navigation systems and configured for remote control to enable sailing of the vessel 10 across a predetermined stretch of water.

Figure 13:
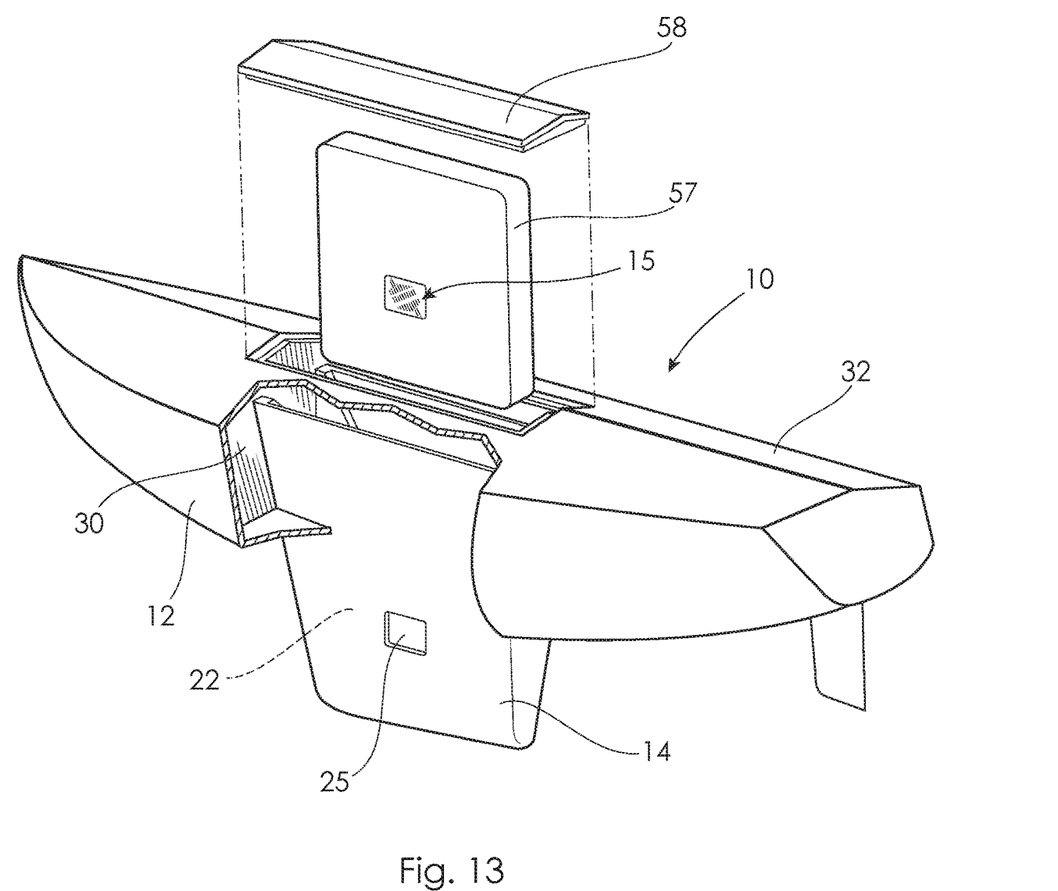
FIG. 13 is a part cutaway shown in perspective of an embodiment of an unmanned surface vessel according to a second aspect of the invention.

FIG. 13 illustrates a preferred embodiment of a second aspect of the unmanned surface vessel 10 designed to accommodate a local device 15 within the flooded cavity 22 of the underwater appendage 14. For ease of reference and in order to avoid repetition, like components have been designated with the same reference numerals. In this second aspect the vessel 10 includes a housing 30 fitted internally of the hull 12 to contain water within the cavity 22 and to prevent it flooding the bilge. The local device 15 may, in a similar manner to the winch, be in the form of a cassette 57 which is retractably received in the cavity 22 and improves the righting moment or stability of the vessel 10. The cassette 57 includes sonar, camera, sensor, battery or other active or passive local devices 15. The underwater appendage 14 of this embodiment includes an aperture 25 in the form of a window in its side wall which permits flooding of the cavity 22 and potentially provides unobstructed detection or sensing depending on the local device which is contained within the cavity 22.

Figure 14A:
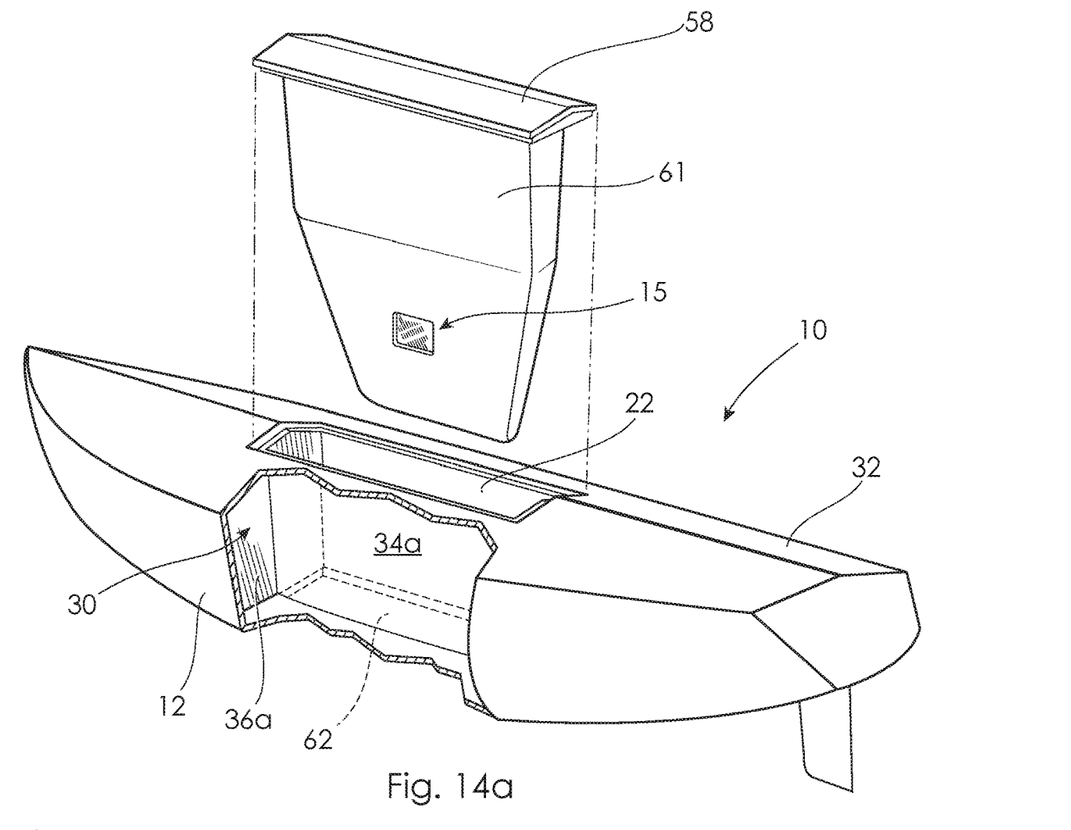
FIGS. 14a and 14b are part cutaways shown in perspective of an embodiment of an unmanned surface vessel according to a third aspect of the invention.
Figure 14B:
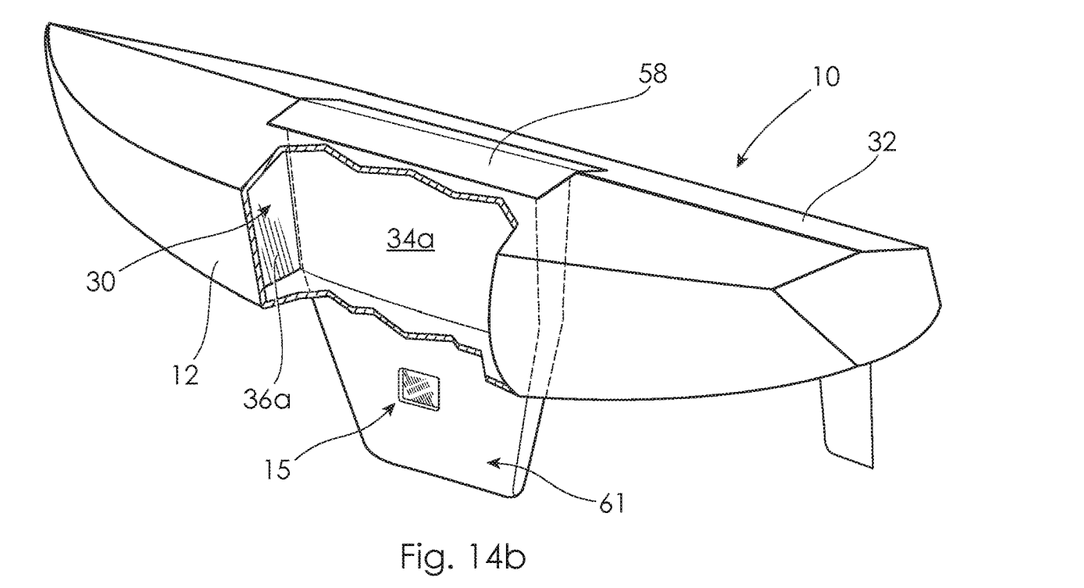

FIGS. 14a and 14b illustrate a preferred embodiment of a third aspect of the unmanned surface vessel 10 comprising a retractable cassette 61 including a local device 15. For ease of reference and in order to avoid repetition, like components have been designated with the same reference numerals. The vessel 10 also comprises a housing 30 of similar construction to the preceding embodiments fitted internally of the hull 12. In this aspect the side walls 34a and 34b extend completely between the hull 12 and the deck 32 thus defining a cavity 22. The cavity 22 in this embodiment extends through the hull 12 via a substantially rectangular opening 62 at its base. The cavity 22 is at least partly flooded with water from outside the hull 12 via the opening 62. The retractable cassette 61 is designed to be slidably received within the flooded cavity 22 of the housing 30.

In this embodiment of the third aspect the retractable cassette 61 is shaped and to some extent functions as a keel. That is, the retractable cassette 61 provides the vessel 10 with stability and, in the event that it is sailed, reduces leeway. The retractable cassette or keel 61 as best shown in FIG. 14a includes the hatch 58 fixed to its head. As best shown in FIG. 14b the hatch 58 on insertion of the retractable cassette 61 into the cavity 22 seats about the deck 32 in a similar manner to the preceding embodiment. Furthermore, this seating of the hatch 58 within the deck 32 provides an appropriate stop for lowering of the retractable cassette or keel 61 into the cavity 22. The local device 15 included within the retractable cassette 61 includes sonar, camera, sensor, battery or any one or more combinations of these active or passive devices. The retractable cassette 61 may vary in construction depending largely on the nature and design of the local device 15, for example:
1. the retractable cassette 61 may be partly or entirely hollow for housing the local device 15 together with any associated equipment;
2. the retractable cassette 61 may at least in its lower portions be cast in lead or another appropriate ballast-type material with the local device 15 partly embedded in the cast material possibly with an exposed window;
3. the retractable cassette 61 may be constructed from a combination of the hollow and solid configurations of items 1 and 2.

Although not illustrated the retractable cassette or keel 61 may include lifting means for lowering or raising the retractable cassette or keel 61.

Now that several preferred embodiments of the invention have been described it will be understood that the unmanned surface vessel has at least the following advantages:
1. the internal design of the unmanned surface vessel having a cavity within the underwater appendage lends itself to containment of a relatively large winch in its vertical orientation;

2. the cavity of the underwater appendage and in particular the keel is flooded via the keel opening for the cable or rope thus improving the righting moment and stability of the vessel;
3. the winch itself is relatively heavy and being located within the cavity of the underwater appendage further improves the stability or righting moment of the vessel;
4. the partly flooded cavity of the embodiment of the second aspect is conveniently designed to accommodate a local device in the form of a retractable cassette;
5. the housing fitted internally of the hull about the cavity permits flooding of the cavity via an aperture in the underwater appendage through which unobstructed vision is provided for the local device;
6. the retractable cassette of the preferred embodiments forms an interface via which proprietary systems can be loaded onto the vessel.

Those skilled in the art will appreciate that the invention described herein is susceptible to variations and modifications other than those specifically described. The housing may completely span the deck and hull whereby the compartment above the cavity is effectively sealed with the hatch installed. The drive system for rotation of the winch may be directly geared or otherwise meshed to one of the flanges of the winch. The winch may also protrude or extend above deck level of the vessel provided it is at least partly within the cavity of the underwater appendage. All such variations and modifications are to be considered within the scope of the present invention the nature of which is to be determined from the foregoing description.

The invention claimed is:

1. An unmanned surface vessel comprising:
    a hull;
    an underwater appendage in the form of a keel which is at least in part hollow thereby defining a cavity, the keel being attached to the hull;
    a winch located at least partly within the cavity, the winch arranged to cooperate with a cable or rope to be deployed and retrieved from the vessel via operation of the winch;
    the keel including at least one aperture through which the cable or rope passes, said aperture being adapted to permit the ingress of water from outside the hull into at least the cavity of the keel improving the righting moment of the unmanned surface vessel.

2. An unmanned surface vessel as claimed in claim 1 wherein the winch is substantially aligned with a vertical axis of the keel and a majority of the winch is located within the cavity improving the righting moment of the vessel, the winch having an axis of rotation oriented substantially perpendicular to the keel's vertical axis.

3. An unmanned surface vessel as claimed in claim 1 also comprising a housing fixed internally of the hull and designed to contain the winch, the housing arranged to contain water substantially within the cavity of the keel.

4. An unmanned surface vessel as claimed in claim 3 wherein the housing is arranged to retractably receive a cassette including the winch.

5. An unmanned surface vessel as claimed in claim 1 wherein the winch is designed to allow and contain spooling of the cable or rope, sufficiently constrained as to reduce the likelihood of overriding of the cable or rope within the winch.

6. An unmanned surface vessel as claimed in claim 5 wherein the winch includes a central hub and an opposing pair of flanges mounted either side of the hub, the flanges being separated a distance equal to or slightly greater than the diameter of the cable or rope.

7. An unmanned surface vessel as claimed in claim 1 wherein the cable or rope includes a remote device mounted at its distal end.

8. An unmanned surface vessel as claimed in claim 7 wherein the aperture is sized to permit passage of the remote device on retrieval of the cable or rope via the winch, the remote device thus being stowed within the cavity of the keel.

9. An unmanned surface vessel as claimed in claim 7 wherein the remote device includes a sensor, camera, or sampler.

10. An unmanned surface vessel as claimed in claim 1 further comprising a rudder located forward of the keel thereby reducing likelihood of the cable or rope fouling the rudder on deployment of the cable or rope.

11. An unmanned surface vessel as claimed in claim 1 wherein the unmanned surface vessel is a sailing vessel.

12. An unmanned surface vessel comprising:
    a hull;
    an underwater appendage in the form of a keel which is at least in part hollow thereby defining a cavity, the keel being attached to the hull and adapted to permit flooding of water from outside the hull into at least the cavity of the keel;
    a housing fitted internally of the hull and surrounding the cavity, the housing adapted to contain the flooded water substantially within the cavity;
    a local device located at least partly within the cavity.

13. An unmanned surface vessel as claimed in claim 12 wherein the keel includes an aperture which permits the ingress of water into the cavity for its flooding.

14. An unmanned surface vessel as claimed in claim 12 wherein the local device is in the form of a cassette which is retractably received in the housing.

15. An unmanned surface vessel as claimed in claim 12 wherein the local device includes sonar, camera, sensor, batteries or any one or more combinations of these active or passive local devices.

* * * * *